(12) United States Patent
Shebaita

(10) Patent No.: US 9,183,333 B2
(45) Date of Patent: Nov. 10, 2015

(54) GENERALIZED MOMENT BASED APPROACH FOR VARIATION AWARE TIMING ANALYSIS

(71) Applicant: Synopsys, Inc., Mountain View, CA (US)

(72) Inventor: Ahmed M. Shebaita, Santa Clara, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/965,107

(22) Filed: Aug. 12, 2013

(65) Prior Publication Data

US 2015/0046897 A1    Feb. 12, 2015

(51) Int. Cl.
  *G06F 17/50*    (2006.01)
  *G06F 11/22*    (2006.01)
  *G06F 9/455*    (2006.01)
  *G01R 31/28*    (2006.01)

(52) U.S. Cl.
  CPC ........ *G06F 17/5045* (2013.01); *G01R 31/2882* (2013.01); *G06F 17/5031* (2013.01); *G01R 31/2894* (2013.01); *G06F 17/5068* (2013.01); *G06F 2217/84* (2013.01)

(58) Field of Classification Search
  CPC ............ G06F 17/5031; G06F 17/5022; G06F 17/505; G06F 17/5045; G06F 17/5036; G06F 17/5068; G06F 17/5081; G06F 17/5058; G06F 2217/84
  USPC .......... 716/108, 113, 136, 110–111, 132, 134
  See application file for complete search history.

(56) References Cited

U.S. PATENT DOCUMENTS

| | | | |
|---|---|---|---|
| 8,275,584 B2* | 9/2012 | Lin et al. | 703/2 |
| 2004/0243954 A1* | 12/2004 | Devgan et al. | 716/6 |
| 2008/0072198 A1* | 3/2008 | Celik et al. | 716/6 |
| 2009/0288050 A1* | 11/2009 | Celik et al. | 716/6 |
| 2009/0288051 A1* | 11/2009 | Hemmett et al. | 716/6 |
| 2012/0072880 A1 | 3/2012 | Le et al. | |

OTHER PUBLICATIONS

Pillage, Lawrence T., et al. "Asymptotic Waveform Evaluation for Timing Analysis." IEEE Transactions on Computer-Aided Design, vol. 9, No. 4 (Apr. 1990) pp. 352-366. 15 pages.

(Continued)

*Primary Examiner* — Stacy Whitmore
*Assistant Examiner* — Magid Dimyan
(74) *Attorney, Agent, or Firm* — HIPLegal LLP; Judith A. Szepesi

(57) ABSTRACT

A method and apparatus of a device that performs a generalized moment based variation aware timing analysis on a circuit design is described. The device receives a signal path that traverses a plurality of gates. For each of the plurality of gates, the device retrieves a statistical distribution that represents delay variation at the gate. The statistical distribution for each gate is measured by a number of statistical moments that include higher order statistical moments besides the mean and the standard deviation of the distribution. The device computes statistical moments to represent the timing variation on the signal path by propagating statistical distributions of the gates on the signal path. The device reconstructs a statistical distribution function for timing variation on the signal path based on the computed statistical moments.

20 Claims, 9 Drawing Sheets

(56) References Cited

OTHER PUBLICATIONS

A. Multu, J. Le, R. Milina, and M. Celik, "A parametric approach for handling local variation effects in timing analysis," Proc. DAC, pp. 126-129, 2009.
Sachin S. Sapatnekar, *Timing*. New York: Kluwer, 2004.
Xin Li et al., "Asymptotic probability extraction for Non-Normal distributions of circuit performance" *IEEE/ACM International Conference on Computer-Aided Design (ICCAD)*, pp. 2-9, 2004.
Lawrence T. Pillage et al., Asymptotic Waveform Evaluation for Timing Analysis, IEEE Transactions on Computer-Aided Design, vol. 9, No. 4, Apr. 1990, p. 352-366.
Altan Odabasioglu, PRIMA: Passive Reduced-Order Interconnect Macromodeling Algorithm, IEEE Transactions on Computer-Aided Design of Integrated Circuits and Systems, vol. 17, No. 8, August 1998, p. 642-654.

\* cited by examiner

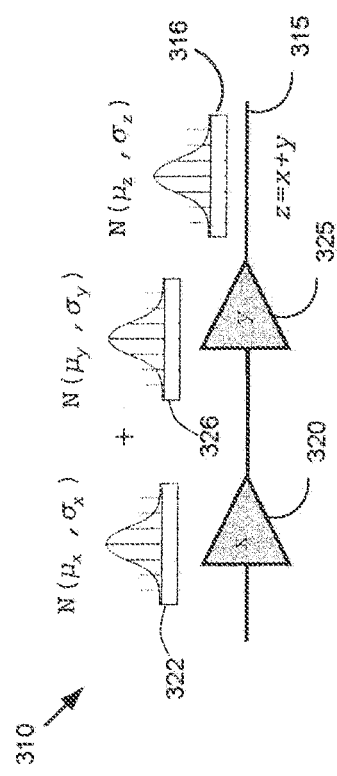
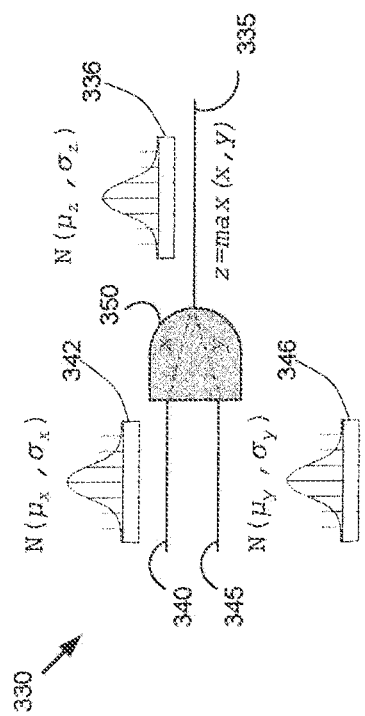
FIG. 3A (Prior Art)
FIG. 3B (Prior Art)

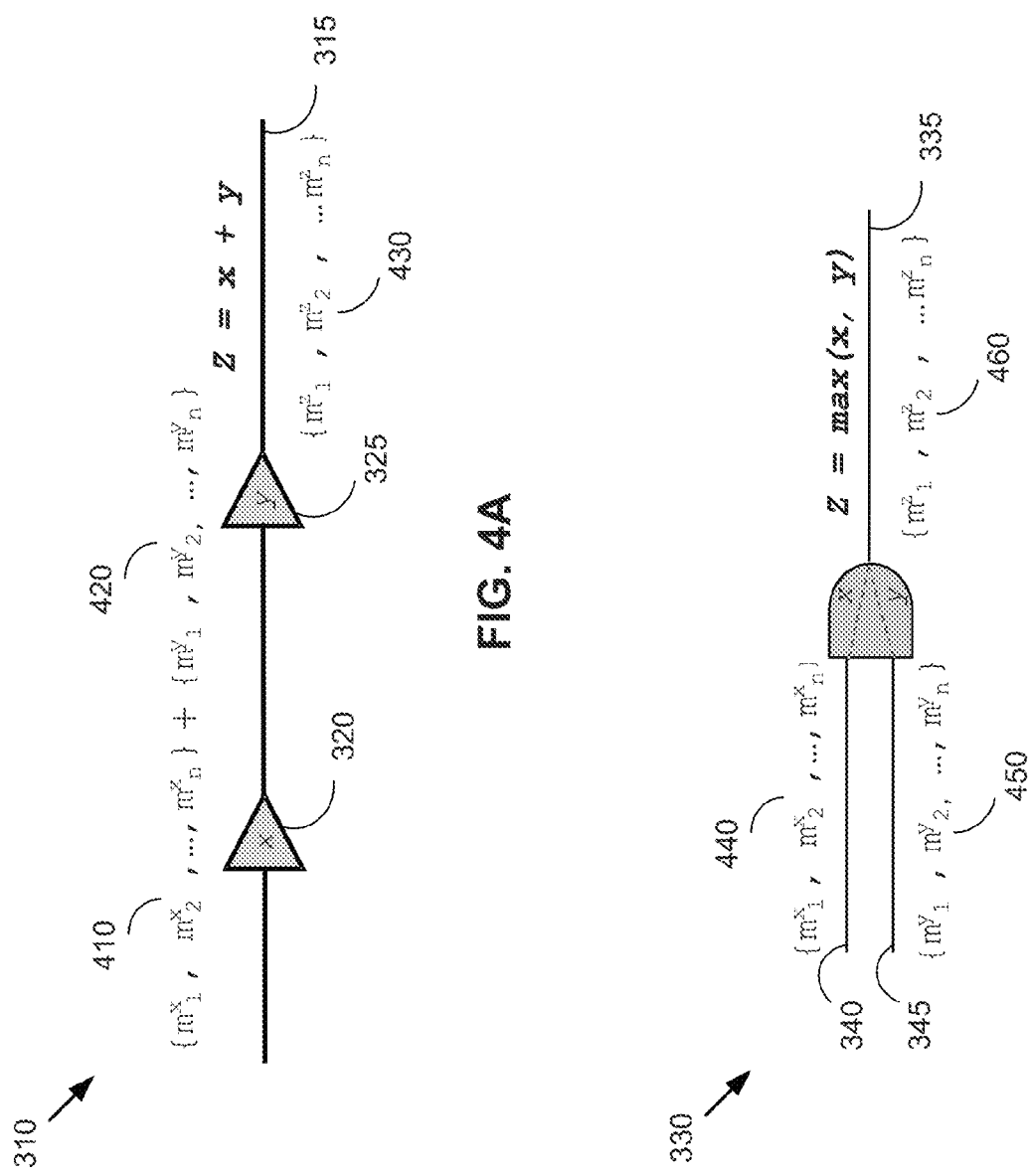

GENERALIZED MOMENT BASED APPROACH FOR VARIATION AWARE TIMING ANALYSIS

FIELD

The present invention relates to electronic design automation and in particular to timing analysis in electronic design automation.

BACKGROUND

Continuous scaling of integrated circuits has made circuits increasingly susceptible to variations. These variations can erode timing windows, and eventually contribute to circuit failure. This has resulted in increasing interest in statistical modeling techniques that can be used to enable statistical analysis and optimization of circuit designs.

Sampling based statistical timing analysis is prohibitively expensive and difficult to construct. An efficient but still pessimistic approach known as on-chip variations (OCV) approach uses timing-derating factors on gate and wire delays. OCV imposes unrealistic performance penalty on the circuit designs. A less pessimistic approach known as parametric on chip variation (POCV) assigns each gate delay the standard deviation of its change. Hence, the probability density functions (pdf) of the gate delays are always assumed Gaussian.

The Gaussian is a poor assumption for capturing the shapes of gate delay distributions. The reason is that any Gaussian distribution has zero skewness so if the distribution of the delay through the gate is skewed, this skewness will not be captured by any Gaussian distribution. Also, the Gaussian distribution has zero peakedness (kurtosis) so it cannot capture the peakedness of the distribution. Therefore, the POCV approach cannot accurately capture the shapes of gate delay distributions. Moreover, in order to maintain the presumed Gaussian assumption, a crude approximation is applied to the maximum operation which results in pessimistic mean and standard deviation.

BRIEF DESCRIPTION OF THE FIGURES

The present invention is illustrated by way of example, and not by way of limitation, in the figures of the accompanying drawings and in which like reference numerals refer to similar elements and in which:

FIG. 3A illustrates an example of accumulating inaccuracy due to Gaussian assumption.

FIG. 3B illustrates an example of introducing inaccuracy through maximum operation due to Gaussian assumption.

FIG. 4A illustrates an example of applying an add operation to two random variables in one embodiment.

FIG. 4B illustrates an example of applying a maximum operation to two random variables in one embodiment.

DETAILED DESCRIPTION

A method and apparatus to perform a generalized moment based variation aware timing analysis on a circuit design is described. In an exemplary embodiment, the device receives a signal path that traverses a plurality of gates. For each of the plurality of gates, the device retrieves a statistical distribution that represents delay variation at the gate. The statistical distribution for each gate is measured by a number of statistical moments that include higher order statistical moments in addition to the mean and the standard deviation of the distribution. The device computes statistical moments to represent the timing variation on the signal path by propagating statistical distributions of the gates on the signal path. In one embodiment, the device converts the computed statistical moments for the signal path to timing moments. The device then converts the timing moments to time-domain parameters.

In one embodiment, the device converts the timing moments to time-domain parameters by using one of the moment matching techniques, such as Asymptotic Waveform Evaluation (AWE), which extracts the dominant poles and residues from the timing moments. One skilled in the art understands that there are many techniques to convert the timing moments into timing domain parameters and any of them can be used here.

With continuous scaling down of integrated circuits, it is becoming more and more expensive to tolerate pessimism. Hence, it becomes useful to introduce a novel approach that is not only more accurate and efficient than POCV, but also flexible enough to accommodate the continuous increase in the accuracy enhancements requirements in statistical timing analysis.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
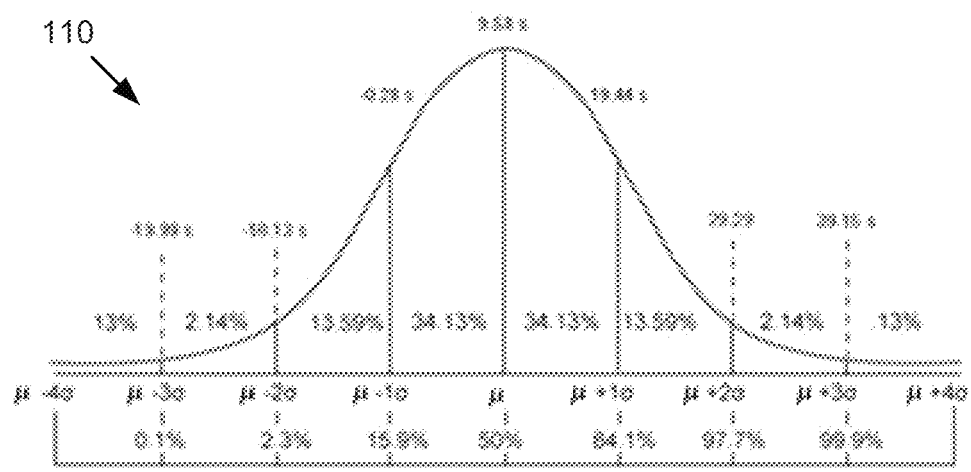
FIG. 1A illustrates a typical Gaussian distribution.
Figure 1B:
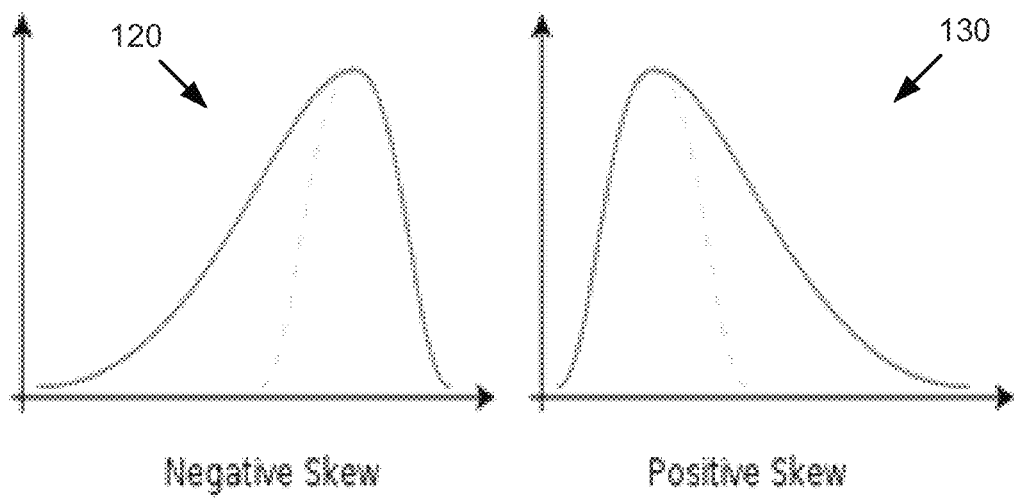
FIG. 1B illustrates two examples of distributions with non-zero skewness.
Figure 2:
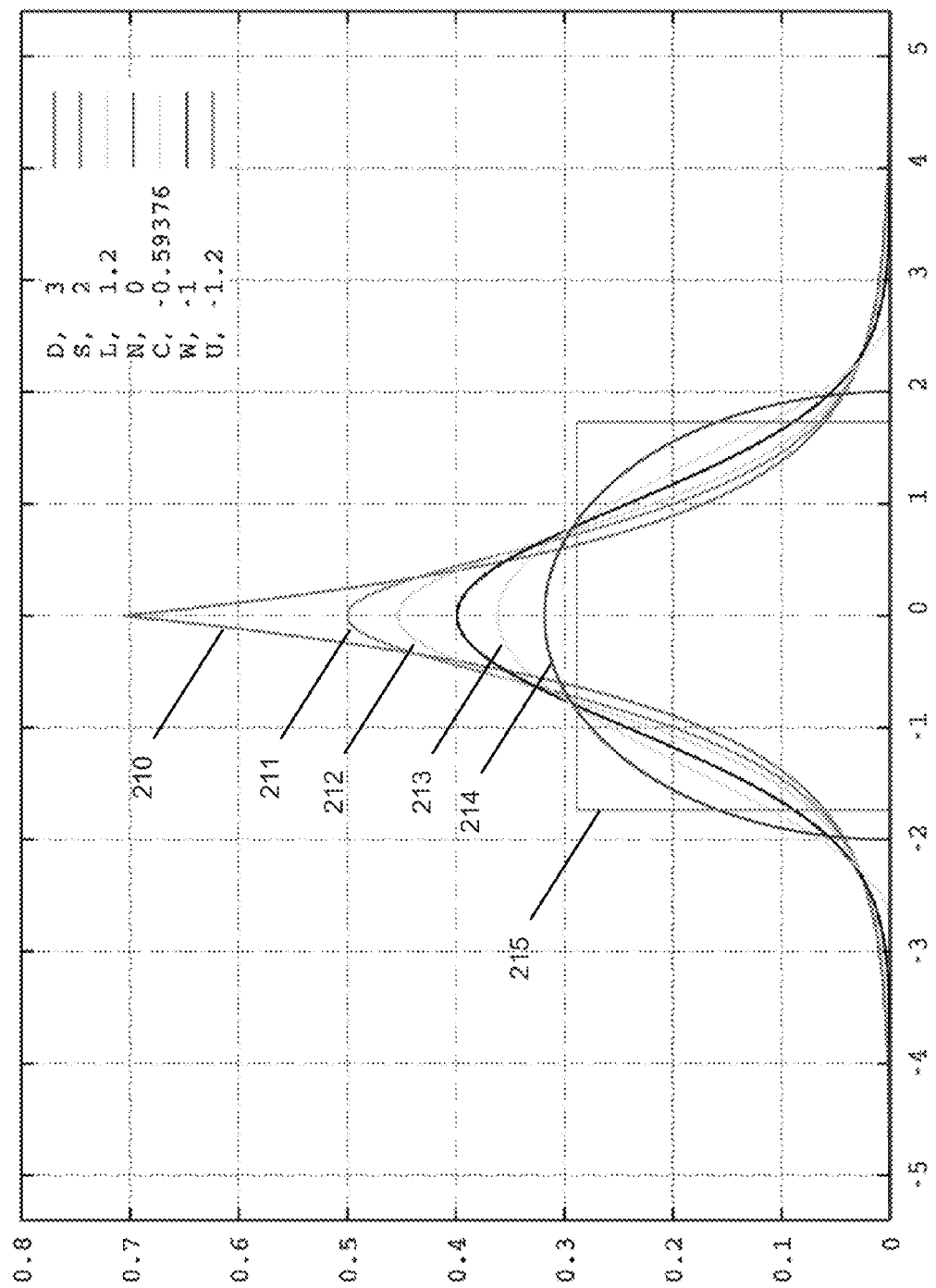
FIG. 2 illustrates several examples of distributions with non-zero kurtosis.

FIGS. 1A, 1B and FIG. 2 illustrate examples of the problems in using prior art POCV to perform statistical timing analysis. The POCV methodology is based upon the assumption that each probability density function (pdf) of the gate delays follows Gaussian distributions. That is, the delay variation is described using only the mean, $\mu$, and the standard deviation, $\sigma$, which is defined as the second central moment of the distribution. A typical Gaussian distribution 110 is shown in FIG. 1A. The standard deviation, $\sigma$, is given by:

$$\sigma = \int_{-\infty}^{\infty} (x-\mu)^2 f(x) dx \qquad (1)$$

Beside the mean and the standard deviation, other coefficients are required in order to accurately represent the pdf of a distribution. Examples of these coefficients are the skewness, $\gamma$, and the kurtosis, $\zeta$, of the distribution. Skewness is a measure of the extent to which a probability distribution of a real-valued random variable "leans" to one side of the mean. Kurtosis is any measure of the "peakedness" of the probability distribution of a real-valued random variable. The skewness, $\gamma$, and the kurtosis, $\zeta$, of the distribution, are given by:

$$\gamma = \frac{\sqrt{N_2}}{M_1} \quad (2)$$

$$\zeta = \frac{N_3}{N_2^{1.5}} \quad (3)$$

where $N_i$ is the $i_{th}$ central moment and $M_i$ is the $i_{th}$ raw moment of the distribution. $N_i$ and $M_i$ are defined by the equations:

$$N_i = \int_{-\infty}^{\infty} (x-\mu)^i f(x) dx \quad (4)$$

$$M_i = \int_{-\infty}^{\infty} x^i f(x) dx \quad (5)$$

Any Gaussian distribution is defined as having zero skewness and zero kurtosis, i.e., $\gamma=0$ and $\zeta=0$. This imposes a limitation on the capability of a Gaussian distribution to capture the behavior of an arbitrary statistical distribution.

FIG. 1B shows two examples of distributions with non-zero skewness. Specifically, this figure illustrates a distribution 120 with negative skew and a distribution 130 with positive skew. Because a Gaussian has zero skewness, a higher order moment, i.e., skewness, needs to be used in order to accurately represent the shape of the distributions 120 and 130.

FIG. 2 shows several examples of distributions with non-zero kurtosis. Specifically, this figure illustrates distributions 210-215, each of which has non-zero kurtosis. Because a Gaussian distribution has zero kurtosis, a higher order moment, i.e., kurtosis, needs to be used to accurately represent the shapes of distributions 210-215.

FIG. 3AB illustrates examples of inaccuracy caused by using POCV to perform statistical timing analysis. POCV is a simple way to do statistical derating of delay variations. Because delay variations in POCV assume a Gaussian, $N(\mu, \sigma)$, for both inputs and outputs of gates, inaccuracy is not only introduced in the representation of the delay variations, but also introduced and accumulated in the propagation of the delay variations.

FIG. 3A illustrates an example of accumulating inaccuracy due to Gaussian assumption. Specifically, this figure illustrates the accumulation of inaccuracy through the add operation. As shown in FIG. 3A, the circuit 310 includes a signal path 315 that travels through gate x 320 and gate y 325. The delay variation at gates x 320 is represented by a Gaussian variable $N(\mu_x, \sigma_x)$ 322. The delay variation at gates y 325 is represented by a Gaussian variable $N(\mu_y, \sigma_y)$ 326. The timing variation z on the signal path 315 is represented by a Gaussian variable $N(\mu_z, \sigma_z)$ 316.

Because gates x and y are connected in series, the delay z on the signal path 315, i.e., the propagation of the delays at gates x and y, can be calculated by performing an add operation on Gaussian variables 322 and 326, i.e., z=x+y. The mean and standard deviation of the resulting Gaussian variable 316 are calculated by:

$$\mu_z = \mu_x + \mu_y \quad (6)$$

$$\sigma_z^2 = \sigma_x^2 + \sigma_y^2 \quad (7)$$

Inaccuracy is initially introduced when using Gaussian variables 322 and 326 to represent the delay variations at gates x and y. By performing add operation on Gaussian variables 322 and 326 to calculate the Gaussian variable 316, the inaccuracy is further accumulated for the timing variation z on the signal path 315.

FIG. 3B illustrates an example of introducing inaccuracy through maximum operation due to Gaussian assumption. Specifically, this figure illustrates the introduction of inaccuracy through pessimistic approximation in the maximum operation. As shown in FIG. 3B, the circuit 330 includes two signal paths x 340 and y 345 that converge at the output pin of a gate 350 to form a single signal path z 335. The timing variation for signal path x 340 is represented by a Gaussian variable $N(\rho_x, \sigma_x)$ 342. The timing variation for path y 345 is represented by a Gaussian variable $N(\mu_y, \sigma_y)$ 346. The timing variation z for the converged signal path 335 is represented by a Gaussian variable $N(\mu_z, \sigma_z)$ 336.

The timing variation z on the converged signal path 335 is the propagation of the timing variations for signal paths x 340 and y 345. Therefore, Gaussian variable 336 can be calculated by performing a maximum operation on Gaussian variables 342 and 346, i.e., z=max(x, y). However, the result of the maximum operation of two Gaussian random variables does not follow Gaussian distribution. Hence, in order to maintain the Gaussian assumption, the POCV applies a pessimistic approximation in the calculation of the mean and standard deviation. For Z=max(X, Y), where X and Y are independent Gaussian variables 342 and 346, the mean and standard deviation for Z, i.e., Gaussian variable 336, are approximated by:

$$\mu_z = \max(\mu_x, \mu_y) \quad (8)$$

$$\sigma_z = \frac{\max(\mu_x + 3\sigma_x, \mu_y + 3\sigma_y) - \mu_z}{3} \quad (9)$$

Inaccuracy is initially introduced when using Gaussian variables 342 and 346 to represent the timing variations for paths x and y. By performing the maximum operation on Gaussian variables 342 and 346 through approximations in equations (8) and (9), the POCV approach imposes more inaccuracy and more pessimism on the resulting Gaussian variable 336, and therefore more inaccuracy on timing variation z for the signal path 335.

FIG. 4AB illustrates examples of generalized moment-based approach (GMBA) to perform statistical timing analysis, in accordance with one embodiment. The GMBA uses supplementary statistical moments in addition to the second moment (i.e., standard deviation) so that the distribution shape can be described accurately with no prior assumption of the distribution shape. In fact, the more statistical moments are used by the GMBA, the more accurate the representation of the distribution shape. In one embodiment, this adjustments enables the accurate representation of both add and maximum operations in closed form expressions as will be shown in FIGS. 4A and 4B.

FIG. 4A illustrates an example of applying an add operation to two random variables in one embodiment. Specifically, this figure illustrates applying the add operation to random variables representing delay variations at gates x 320 and y 325. The delay variation at gates x 320 is represented by a random variable 410 that has n moments $\{m^x_1, m^x_2, \ldots, m^x_n\}$. The delay variation at gates y 325 is represented by a random variable 420 that has n moments $\{m^y_1, m^y_2, \ldots, m^y_n\}$.

The timing variation z on the signal path 315 is represented by a random variable 430 that has n moments $\{m^z_1, m^z_2, \ldots, m^z_n\}$.

The $i_{th}$ central moment, $N_i$ is related to the $i_{th}$ raw moments $M_i$ using the following:

$$M_i = \sum_{j=0}^{i} \binom{i}{j} N_{i-j} \mu^j \tag{10}$$

The timing variation z on the signal path 315, i.e., the propagation of the delays at gates x and y, can be calculated by performing an add operation on random variables 410 and 420, i.e., z=x+y. The resulting random variable 430 has the $i_{th}$ moment given by:

$$M_i(Z) = \sum_{j=0}^{i} \binom{i}{j} M_j(X) M_{i-j}(Y) \tag{11}$$

Where $M_i(X)$ is the $i_{th}$ moment of the random variable 410, $M_i(Y)$ is the $i_{th}$ moment of the random variable 420, and $M_i(Z)$ is the $i_{th}$ moment of the random variable 430.

FIG. 4B illustrates an example of applying a maximum operation to two random variables in one embodiment. Specifically, this figure illustrates applying the maximum operation to random variables representing timing variations at two converging signal paths x 340 and y 345. The timing variation for signal path x 340 is represented by a random variable 440 that has n moments $\{m^x_1, m^x_2, \ldots, m^x_n\}$. The timing variation for path y 345 is represented by a random variable 450 that has n moments $\{m^y_1, m^y_2, \ldots, m^z_n\}$. The timing variation z for the converged signal path 335 is represented by a random variable 460 that has n moments $\{m^z_1, m^z_2, \ldots, m^z_n\}$.

The timing variation z on the converged signal path 335 is the propagation of the timing variations for signal paths x 340 and y 345. Therefore, random variable 460 can be calculated by performing a maximum operation on random variables 440 and 450, i.e., z=max(x, y). For Z=max(X, Y), where X and Y are independent random variables 440 and 450, and Z is random variable 460, the $i_{th}$ moment of Z, $m_i(Z)$, is given by:

$$m_i(Z) = \iint_{-\infty}^{\infty} (\max(x,y))^i f(x)f(y) dx dy = \int_{-\infty}^{\infty} y^i f(y) \int_{-\infty}^{y} f(x) dx dy + \int_{-\infty}^{\infty} x^i f(x) \int_{-\infty}^{x} f(y) dy dx \tag{12}$$

Where $f(x)$ and $f(y)$ are the probability density functions of the random variables X and Y, respectively. In terms of the poles and residues of $f(x)$ and $f(y)$, it can be proven that the $i_{th}$ moment of Z will be given by:

$$m_i(Z) = i! \sum_{l=1}^{n} \sum_{k=1}^{n} \frac{r_l(y) r_k(x)}{p_k(x)} \left( \left( \frac{1}{p_l(y) + p_k x} \right)^{i+1} - \left( \frac{1}{p_l(y)} \right)^{i+1} \right) + \frac{r_l(x) r_k(y)}{p_k(y)} \left( \left( \frac{1}{p_l(x) + p_k(y)} \right)^{i+1} - \left( \frac{1}{p_l(x)} \right)^{i+1} \right) \tag{13}$$

Where $p_i$ and $r_i$ represent the $i_{th}$ pole and $i_{th}$ residue of the corresponding random variable, respectively. Using any moment matching technique, e.g., Asymptotic Waveform Evaluation (AWE), the most dominant n poles and n residues can be easily extracted from the first 2n moments. In one embodiment, 2 dominant poles and 2 dominant residues that are extracted from the first 4 statistical moments give very good representation of the random variable. The derivation in equation (13) allows for accurate representation of the maximum operation with no pessimistic approximation like those performed by the POCV algorithm.

Figure 5:
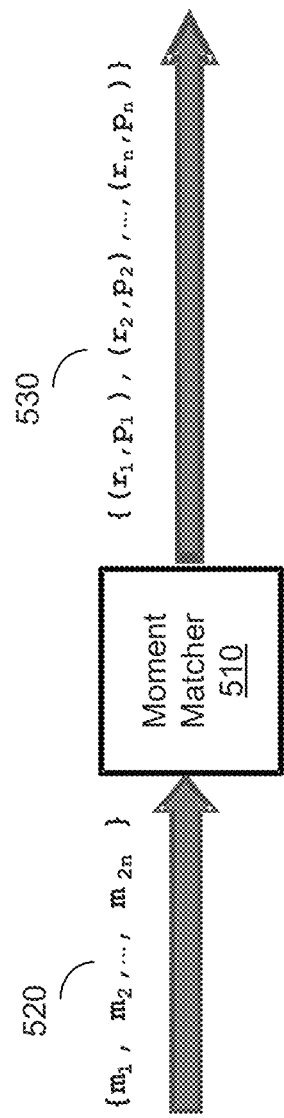
FIG. 5 illustrates an example of using a moment matching method to approximate a random variable with reasonable accuracy in one embodiment.

FIG. 5 illustrates an example of using a moment matching method to approximate a random variable with reasonable accuracy in one embodiment. Specifically, this figure illustrates using a moment matching method (in one embodiment, AWE) to extract the most dominant n poles and n residues from 2n moments of a random variable. As illustrated in FIG. 5, in one embodiment, a moment matcher 510 receives as input a random variable 520 that has 2n moments $\{m_1, m_2, \ldots, m_{2n}\}$ and outputs n pairs of poles and residues 530, which represents the most dominant n poles and n residues $\{(r_1, p_1), (r_2, p_2), \ldots, (r_n, p_n)\}$ of the random variable 520.

The most dominant poles of a random variable are poles located closest to the imaginary axis, which is the axis in the complex plane corresponding to zero real part, R[z]=0. The most dominant residues are residues corresponding to the most dominant poles. The most dominant poles and residues of a random variable are poles and residues that most closely represent the characteristics of the random variable, thus can be used to achieve a very good approximation of the random variable. In one embodiment, the moments of the input random variable 520 are timing moments that are converted from statistical moments obtained from add and/or maximum operations described in FIGS. 4A and 4B above.

In one embodiment, the moment matcher 510 uses the AWE technique. In another embodiment, the moment matcher 510 uses another moment matching technique, such as Galerkin asymptotic waveform evaluation (GAWE), multipoint Galerkin asymptotic waveform evaluation (MGAWE), matrix-Fade via Lanczos (MPVL), or another technique now known or later developed. Because in one embodiment the most dominant n poles and n residues are extracted from 2n moments of a random variable, the approximation can achieve reasonable accuracy.

Figure 6:
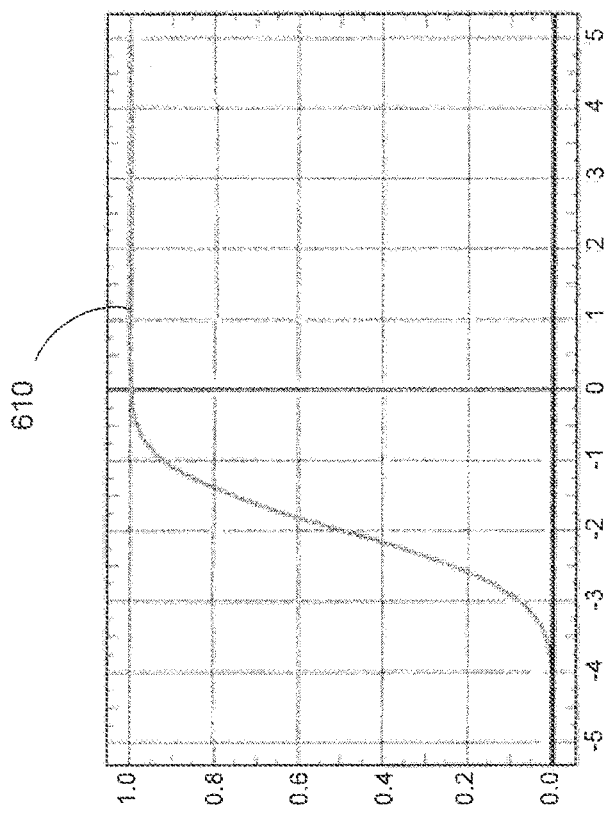
FIG. 6 illustrates an example of a cumulative distribution function (CDF) reconstructed from a set of poles and residues in one embodiment.

FIG. 6 illustrates an example of a cumulative distribution function (CDF) reconstructed from a set of poles and residues in one embodiment. Specifically, this figure illustrates a CDF 610 that is reconstructed from the most dominant n poles and n residues that are extracted from 2n moments of a random variable. In one embodiment, the CDF 610 can be represented in terms of the poles and residues as:

$$s(t) = \frac{r_1}{p_1}(e^{p_1 t} - 1) + \frac{r_2}{p_2}(e^{p_2 t} - 1) \ldots + \frac{r_n}{p_n}(e^{p_n t} - 1) \tag{14}$$

where $p_1$-$p_n$ and $r_1$-$r_n$ are the most dominant n poles and n residues that are extracted from 2n moments of a random variable. In one embodiment, these dominant poles and residues are extracted using a moment matching technique, as described above. Having the CDF function in a closed form expression, as illustrated in Equation (14), enables calculation of confidence levels. For example, a confidence level, $\mu+3\alpha$, can be calculated using the reconstructed CDF 610. In one embodiment, a user selects a confidence level as part of the timing analysis.

Figure 7:
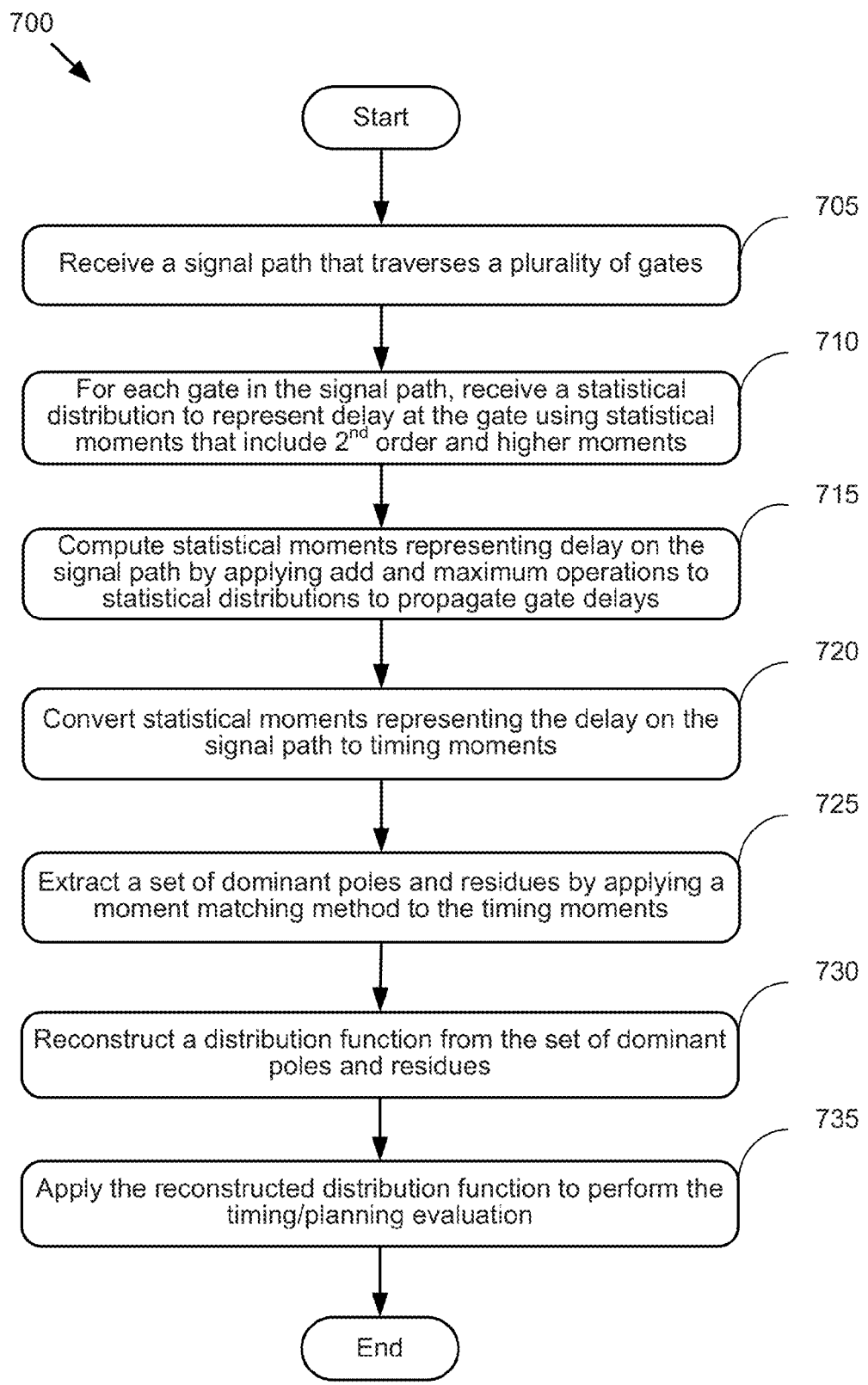
FIG. 7 is a flowchart of one embodiment of performing statistical timing analysis in accordance with the present invention.

FIG. 7 is a flowchart of one embodiment of using generalized moment-based approach (GMBA) to perform statistical timing analysis. Specifically, this figure describes a process 700 that uses higher order statistical moments to enhance the timing variation estimation accuracy. In some embodiments, the process 700 starts when a statistical static timing analysis is being performed. As shown in the figure, the process 700 begins by receiving, at block 705, a signal path that traverses a plurality of gates. In one embodiment, the signal path travels through multiple gates connected in series, as described above in FIG. 4A. In one embodiment, the signal path is the output of a gate that takes multiple signal paths as inputs, as described above in FIG. 4B.

At block 710, for each gate in the signal path, the process 700 receives a gate distribution, i.e., a statistical distribution to represent delay at the gate. The statistical distribution is represented by higher order statistical moments in addition to the mean, $\mu$, and the standard deviation, $\sigma$, of the distribution. In one embodiment, the higher order statistical moments include the skewness, $\gamma$, and the kurtosis, $\zeta$, of the distribution. The more statistical moments are used by the process, the more accurate the representation of the distribution shape. In one embodiment, the statistical distributions represented by higher order statistical moments are retrieved from a standard library provided by a vendor.

In another embodiment, the statistical distributions represented by higher order statistical moments are retrieved from a standard library. In one embodiment, the statistical distributions are derived from statistics related to gate delays. In one embodiment, the statistics regarding delays for different types of gates are collected through simulation of those gates. A statistical distribution of gate delay is derived for each type of gate based on the collected statistics. Higher order statistical moments, such as the skewness, $\gamma$, and the kurtosis, $\zeta$, can be extracted from the statistical distributions of gate delays.

The process 700 at block 715 computes statistical moments of a path distribution representing delay on the signal path by applying add and/or maximum operations to statistical distributions to propagate gate delays. In one embodiment, the gate delays are propagated by performing an add operation on statistical distributions of two adjacent gates connected in series, as described in FIG. 4A above. In one embodiment, if there is a subsequent gate that immediately follows these two gates, the resulting distribution is further propagated by performing add or maximum operation with a distribution related to the subsequent gate. In one embodiment, the gate delays are propagated by performing a maximum operation on statistical distributions on two input paths of a gate, as described in FIG. 4B above. The sequence of operations is determined by the configuration of the plurality of gates received at block 705.

The maximum operation results in a statistical distribution. In one embodiment, if there is a subsequent gate that immediately follows the gate, the resulting distribution of the maximum operation is further propagated by performing add or maximum operation with a distribution related to the subsequent gate.

At block 720, the process 700 converts statistical moments representing the delay on the signal path to timing moments. Those statistical moments are the right of the operations performed at block 715. For an arbitrary function $f(t)$, the $i_{th}$ circuit/signal moment, i.e., the $i_{th}$ timing moment, can be derived by:

$$m_i(s) = \int_{-\infty}^{\infty} \frac{(-t)^i}{i!} f'(t) dt \tag{15}$$

The $i_{th}$ probabilistic moment, i.e., the $i_{th}$ statistical moment, can be derived by:

$$m_i = \int_{-\infty}^{\infty} t^i f'(t) dt \tag{16}$$

Thus, in one embodiment, the statistical moments representing the delay on the signal path are converted to timing moments by:

$$m_i(s) = \frac{(-1)^i}{i!} m_i \tag{17}$$

At block 725, the process 700 extracts a set of dominant poles and residues by applying a moment matching method to the timing moments. In one embodiment, the process uses the AWE technique to extract the most dominant n poles and n residues from 2n timing moments, as described in FIG. 5 above.

Next, the process 700 reconstructs, at block 730, a distribution function from the set of dominant poles and residues, which are extracted from the timing moments at block 725. In one embodiment, the reconstructed distribution function is a CDF function, as described in FIG. 6 above. At block 735, the process 700 applies the reconstructed distribution function to perform the timing/planning evaluation. The process 700 then ends.

One of ordinary skill in the art will recognize that the process 700 is a conceptual representation of the operations used to perform statistical timing analysis. The specific operations of the process 700 may not be performed in the exact order shown and described. The specific operations may not be performed in one continuous series of operations, and different specific operations may be performed in different embodiments. Furthermore, the process could be implemented using several sub-processes, or as part of a larger macro process. For instance, in some embodiments, the process 700 is performed by one or more software applications that execute on one or more computers. One of ordinary skill in the art will also recognize that the methods and apparatus described herein apply to all circuits of an IC in some embodiments, while only applying to a selected portion of the IC in other embodiments.

Figure 8:
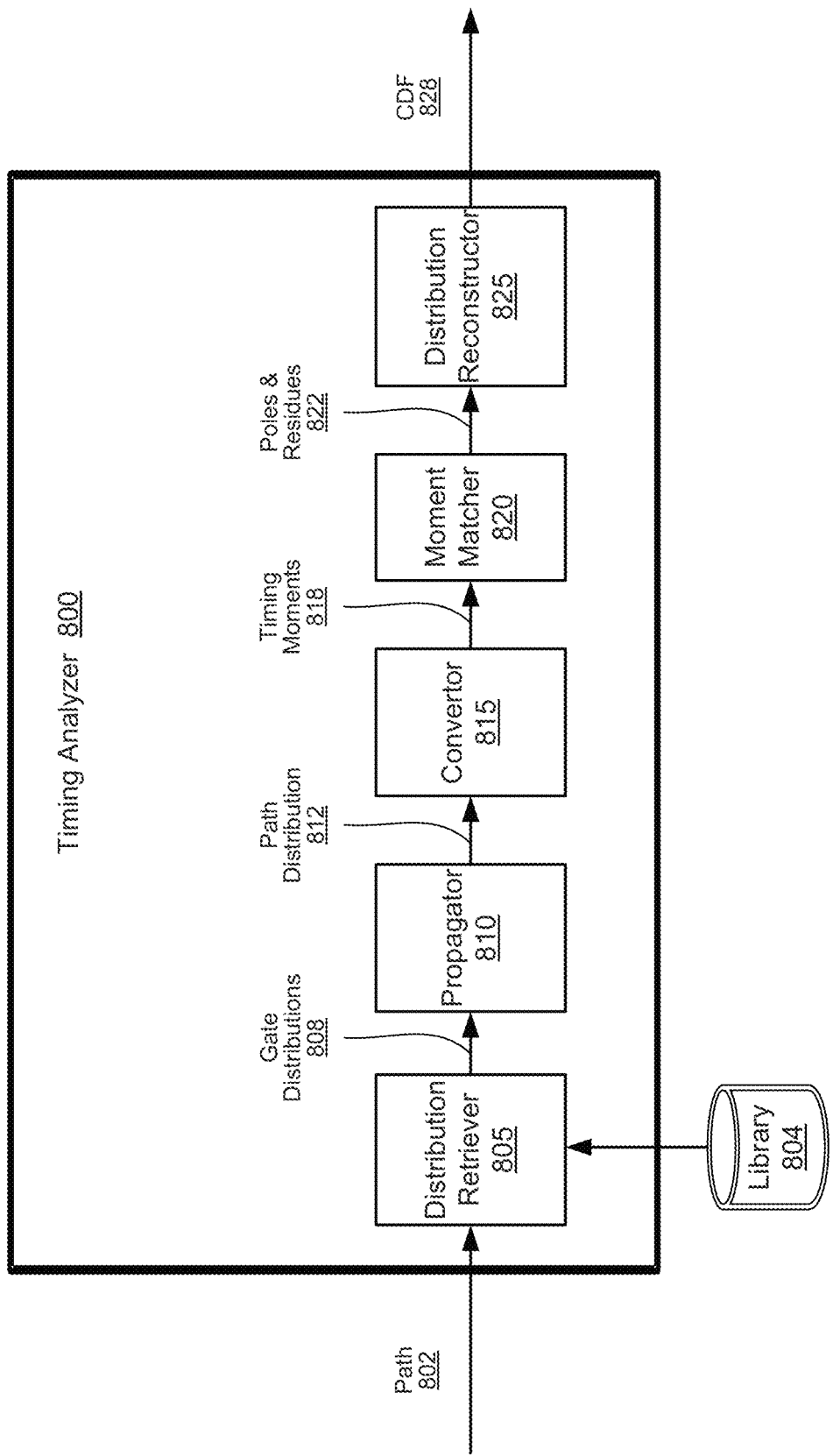
FIG. 8 conceptually illustrates one embodiment of a timing analyzer.

FIG. 8 conceptually illustrates one embodiment of a timing analyzer 800. Specifically, the figure illustrates a set of components for performing the statistical static timing analysis. In one embodiment, the timing analyzer 800 is a stand-alone system, while in another embodiment the timing analyzer 800 is part of a system for performing electronic design automation (EDA) operations. As shown in the figure, the timing analyzer 800 includes a distribution retriever 805, a propagator 810, a convertor 815, a moment matcher 820, and a distribution re-constructor 825.

The distribution retriever 805 receives a signal path 802 that traverses through several gates and retrieves a statistical distribution for each gate. The retrieved statistical distribution represents the delay variation at a gate. The retrieved statistical distribution is represented by higher order statistical moments in addition to the mean, $\mu$, and the standard deviation, $\sigma$, of the distribution. In one embodiment, the higher order statistical moments include the skewness, $\gamma$, and the kurtosis, $\zeta$, of the distribution. In one embodiment, the statistical distributions represented by higher order statistical moments are retrieved from a library 804. In one embodiment, the library 804 is provided by a vendor and contains statistical distributions for different gates. In another embodiment, the library 804 is derived from statistics related to gate delays.

The propagator 810 receives, from the distribution retriever 805, statistical distributions 808 for gates in the path. Each statistical distribution includes higher order statistical moments for the corresponding gate. The propagator 810 propagates gate delays by applying add and/or maximum operations to the statistical distributions 808, based on gate configuration. The propagator 810 generates a path distribution 812 for the signal path 802. In one embodiment, the gate delays are propagated by performing an add operation on statistical distributions of two adjacent gates connected in series, as described in FIG. 4A above. In one embodiment, the gate delays are propagated by performing a maximum operation on statistical distributions on two input paths of a gate, as described in FIG. 4B above. If there is a subsequent gate that immediately follows the gate or gates involved in the operation, the resulting distribution is further propagated by performing add or maximum operation with a distribution related to the subsequent gate.

The convertor 815 receives the path distribution 812 from the propagator 810 and converts the statistical moments of the path distribution 812 to timing moments 818, as described at block 720 of FIG. 7 above.

The moment matcher 820 receives the timing moments 818 from the convertor 815 and converts the timing moments to timing parameters by extracting a set of poles and residues 822 from the timing moments. In one embodiment, the moment matcher 820 uses the AWE technique to extract the most dominant n poles and n residues from 2n timing moments, as described in FIG. 5 above.

The distribution re-constructor 825 receives the set of poles and residues 822 extracted by the moment matcher 820 and reconstructs a distribution function 828 from the set of poles and residues 822. In one embodiment, the reconstructed distribution function 828 is a CDF function, as described in FIG. 6 above. This reconstructed distribution function is then used in statistical timing analysis for circuit layout.

The timing analyzer 800 was described above for one embodiment of the invention. One of ordinary skill in the art will realize that in other embodiments this module can be implemented differently. For instance, in one embodiment described above, certain modules are implemented as software modules. However, in another embodiment, some or all of the modules of the timing analyzer 800 might be implemented by hardware, which can be dedicated application specific hardware (e.g., an ASIC chip or component) or a general purpose chip (e.g., a microprocessor or FPGA).

This description and drawings are illustrative of embodiments of the invention and are not to be construed as limiting the invention. Numerous specific details are described to provide a thorough understanding of the disclosed embodiments. However, in certain instances, well known or conventional details are not described in order to avoid obscuring the description of the disclosed embodiments. References to "an" or "one" embodiment in the present disclosure are not necessarily to the same embodiment; such references mean at least one embodiment.

Many of the methods of the disclosed embodiments may be performed with a digital processing system, such as a conventional, general-purpose computer system. Special purpose computers, which are designed or programmed to perform only one function, may also be used.

Figure 9:
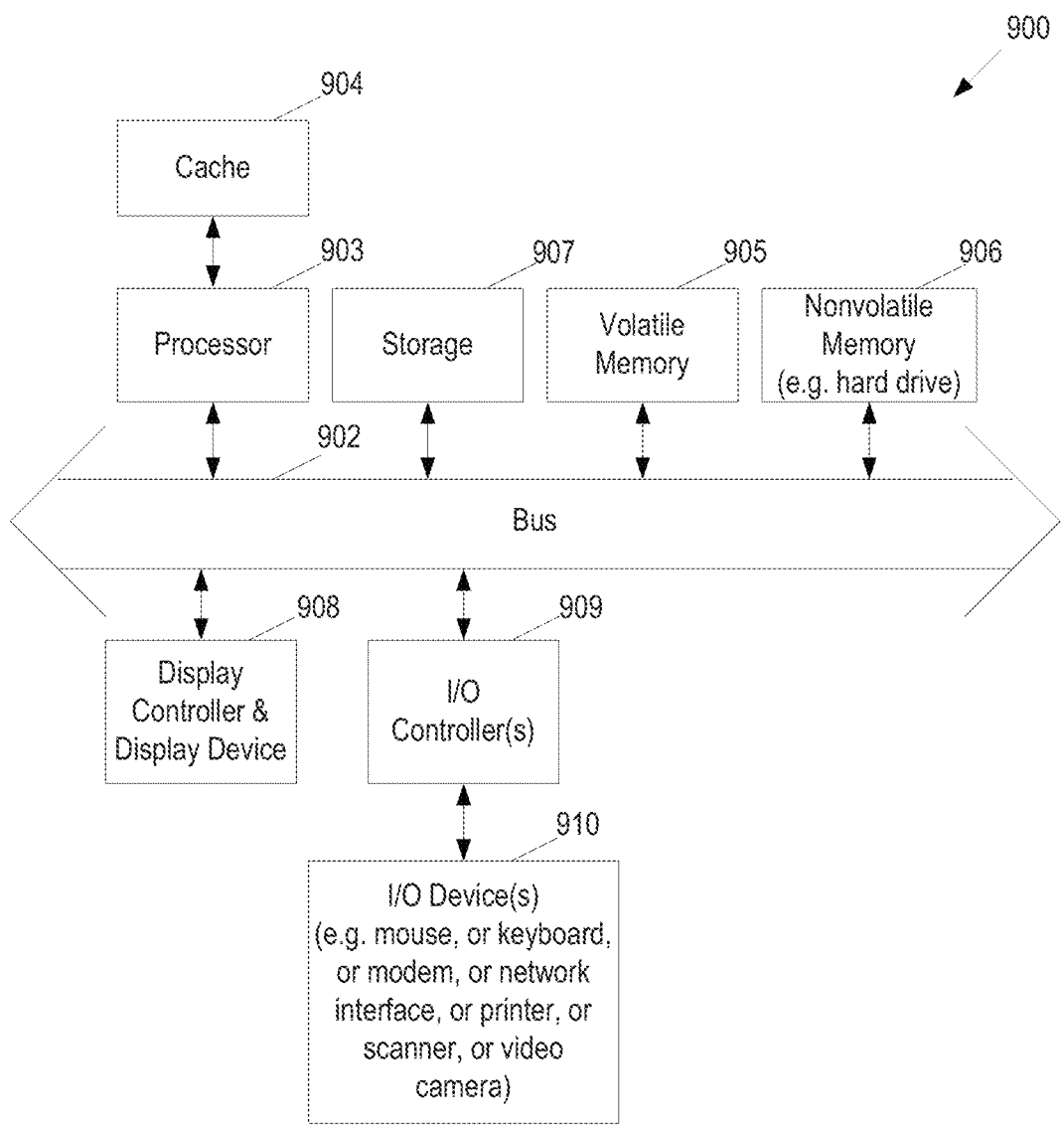
FIG. 9 shows one example of a typical computer system or data processing system that may be used with the disclosed embodiments.

FIG. 9 shows one example of a typical computer system or data processing system that may be used with the disclosed embodiments. For example, in one embodiment the process described with respect to FIG. 7 are operational through the example computing system. However, it is noted that while FIG. 9 illustrates various components of a computer system, it is not intended to represent any particular architecture or manner of interconnecting the components but rather provides an example representation of how the components and architecture may be configured. It will also be appreciated that network computers and other data processing systems that have fewer components or perhaps more components may also be used with the disclosed embodiments. The computer system of FIG. 9 may be any computing system capable of performing the described operations.

As shown in FIG. 9, the computer system 900, which is a form of a data processing system, includes a bus 902, which is coupled to one or more microprocessors 903. In one embodiment, computer system 900 includes one or more of a storage device (e.g., ROM) 907, volatile memory (e.g., RAM) 905, and a non-volatile memory (EEPROM, Flash) 906. The microprocessor 903 is coupled to cache memory 904 as shown in the example of FIG. 9. Cache memory 904 may be volatile or non-volatile memory.

The bus 902 interconnects these various components together and in one embodiment interconnects these components 903, 907, 905, and 906 to a display controller and display device 908. The computer system 900 may further include peripheral devices such as input/output (I/O) devices, which may be mice, keyboards, modems, network interfaces, printers, scanners, video cameras and other devices which are well known in the art. Typically, the input/output devices 910 are coupled to the system through input/output controllers 909.

The volatile memory 905 is typically implemented as dynamic RAM (DRAM) which requires power continually in order to refresh or maintain data in the memory. The non-volatile memory 906 is typically a magnetic hard drive, magnetic optical drive, an optical drive, a DVD RAM, a Flash memory, or other type of memory system which maintains data even after power is removed from the system. Typically, the non-volatile memory will also be a random access memory although this is not required.

While FIG. 9 shows that the non-volatile memory is a local device coupled directly to the rest of the components in the data processing system, it will be appreciated that the disclosed embodiments may utilize a non-volatile memory which is remote from the system, such as a network storage device which is coupled to the data processing system through a network interface such as a modem or Ethernet interface.

The bus 902 may include one or more buses connected to each other through various bridges, controllers and/or adapters as is well known in the art. In one embodiment the I/O controller 909 includes a USB (Universal Serial Bus) adapter for controlling USB peripherals, and/or an IEEE-1394 bus adapter for controlling IEEE-1394 peripherals.

It will be apparent from this description that aspects of the disclosed embodiments may be embodied, at least in part, in software (or computer-readable instructions). That is, the techniques, for example the process of FIG. 7 may be carried out in a computer system or other data processing system in response to its processor, such as a microprocessor, executing sequences of instructions contained in a memory, such as storage device 907, volatile memory 905, non-volatile memory 906, cache 904 or a remote storage device. In various embodiments, hardwired circuitry may be used in combination with software instructions to implement the disclosed embodiments. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as microprocessor 903.

A machine readable storage medium can be used to store software and data which when executed by a data processing system causes the system to perform various methods of the disclosed embodiments. This executable software and data may be stored in various places including for example storage device 907, volatile memory 905, non-volatile memory 906 and/or cache 904 as shown in FIG. 9. Portions of this software and/or data may be stored in any one of these storage devices.

Thus, a machine readable storage medium includes any mechanism that stores any information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.).

The detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The detailed description is, therefore, not to be taken in a limiting sense, and the scope of the present invention is defined by the appended claims.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed description were presented as procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sending" or "receiving" or "displaying" or "calculating" or "determining" or "multiplying" or "computing" or "identifying" or the like, refer to the action and processes of a computer system, or similar electronic computing device that manipulates and transforms data represented as physical (electronic) quantities within the computer system's registers and memories and other computer readable media into other data similarly represented as physical quantities within the computer system's memories or registers or other such information storage, transmission or display devices.

In the foregoing specification, the disclosed embodiments have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

I claim:

1. A method of performing statistical timing analysis on a circuit design upon receipt of a signal path in the circuit design, the method comprising:
   by using a computing device, receiving the signal path that traverses a plurality of gates;
   for each of the plurality of gates, receiving a gate statistical distribution that represents delay variation at the gate using a number of statistical moments that comprises a standard deviation and at least one moment that has a higher order than the standard deviation;
   computing statistical moments for a signal path distribution representing delay on the signal path by applying one or more operations to the gate statistical distributions based on a configuration of the plurality of gates; and
   converting statistical moments of the signal path distribution to timing moments;
   converting the timing moments to timing parameters by extracting a set of poles and residues from the timing moments;
   reconstructing a resulting distribution function based on the computed poles and residues; and
   using the reconstructed resulting distribution function in timing analysis for the circuit design.

2. The method of claim 1, wherein the at least one moment that has a higher order than the standard deviation comprises skewness.

3. The method of claim 1, wherein the one or more operations comprises an add operation.

4. The method of claim 3, wherein the number of statistical moments is n, wherein a first gate statistical distribution X is measured by n moments $\{M_1(X), M_2(X), \ldots M_n(X)\}$, wherein a gate second statistical distribution Y is measured by n moments $\{M_1(Y), M_2(Y), \ldots, M_n(Y)\}$, wherein applying the add operation to the first gate statistical distribution X and the second gate statistical distribution Y results in a third path statistical distribution Z measured by n moments $\{M_1(Z), M_2(Z), \ldots, M_n(Z)\}$, wherein each moment in the third path statistical distribution Z is computed by using moments in the first gate statistical distribution X and the second gate statistical distribution Y.

5. The method of claim 1, wherein the one or more operations comprises a maximum operation.

6. The method of claim 5, wherein the number of statistical moments is n, wherein applying the maximum operation to a first gate statistical distribution X and a second gate statistical distribution Y results in a third path statistical distribution Z measured by n moments $\{M_1(Z), M_2(Z), \ldots, M_n(Z)\}$, wherein each moment in the third path statistical distribution Z is computed by using poles and residues of a first gate distribution function of the first gate statistical distribution X and poles and residues of a second gate distribution function of the second gate statistical distribution Y.

7. The method of claim 1, wherein
converting the timing moments to timing parameters utilizes a moment matching method.

8. The method of claim 7, wherein the moment matching method is asymptotic waveform evaluation (AWE).

9. The method of claim 7, wherein n dominant poles and n dominant residues are extracted by applying the moment matching method to the timing moments, when the number of statistical moments used is 2n.

10. The method of claim 1, wherein the resulting distribution function is a cumulative distribution function (CDF).

11. A system for performing statistical timing analysis comprising:
a processor;
a distribution retriever to retrieve a gate statistical distribution for each gate on a signal path, wherein the statistical gate distribution represents delay variation at the gate using a number of statistical moments that comprises a standard deviation and at least one moment that has a higher order than the standard deviation;
a propagator to compute the number of statistical moments for a signal path distribution representing delay on the signal path by applying one or more operations to the gate statistical distributions based on a configuration of the gates on the signal path;
a convertor to convert statistical moments of the signal path distribution to timing moments;
a second converter to convert the timing moments to timing parameters by extracting a set of poles and residues from the timing moments; and
a distribution reconstructor to reconstruct a resulting distribution function based on the poles and residues.

12. The system of claim 11 wherein the conversion of the timing moments to timing parameters is estimated by a set of dominant poles and residues.

13. The system of claim 11, the second converter further comprising a moment matcher to extract a set of poles and residues from the timing moments.

14. The system of claim 13, wherein the moment matcher performs asymptotic waveform evaluation (AWE).

15. A computer program product stored as program code on a non-transitory computer-readable medium, the program code executable by at least one processor to perform statistical timing analysis on a circuit design upon receipt of a signal path that traverses a plurality of gates, the computer program product comprising a computer readable program code comprising instructions for:
for each of the plurality of gates, receiving a gate statistical distribution that represents delay variation at the gate using a number of statistical moments that comprises a standard deviation and at least one moment that has a higher order than the standard deviation;
computing statistical moments for a signal path distribution representing delay on the signal path by applying one or more operations to the gate statistical distributions based on a configuration of the plurality of gates;
converting statistical moments of the signal path distribution to timing moments;
converting the timing moments to timing parameters by extracting a set of poles and residues from the timing moments;
reconstructing a resulting distribution function based on the computed poles and residues; and
using the reconstructed resulting distribution function in timing analysis for the circuit design.

16. The computer program product of claim 15, wherein the at least one moment that has a higher order than the standard deviation comprises kurtosis.

17. The computer program product of claim 15, wherein the one or more operations comprises an add operation.

18. The computer program product of claim 17, wherein the number of statistical moments is n, wherein a first gate statistical distribution X is measured by n moments $\{M_1(X), M_2(X), \ldots, M_n(X)\}$, wherein a second gate statistical distribution Y is measured by n moments $\{M_1(Y), M_2(Y), \ldots, M_n(Y)\}$, wherein applying the add operation to the first gate statistical distribution X and the second gate statistical distribution Y results in a third path statistical distribution Z measured by n moments $\{M_1(Z), M_2(Z), \ldots, M_n(Z)\}$, wherein each moment in the third path statistical distribution Z is computed by using moments in the first gate statistical distribution X and the second slate statistical distribution Y.

19. The computer program product of claim 15, wherein the one or more operations comprises a maximum operation.

20. The computer program product of claim 19, wherein computer readable program code further comprises instructions for:
calculating a confidence level based on the reconstructed resulting distribution function.

* * * * *